2,861,071
PROCESS FOR THE PRODUCTION OF MONOPHENYLMELAMINE

Oscar P. Cohen, Longmeadow, Harry M. Culbertson, Wilbraham, and Leo E. Rademacher, Longmeadow, Mass., assignors to Monsanto Chemical Company, St. Louis, Mo., a corporation of Delaware No Drawing. Application August 8, 1956
Serial No. 602,928

9 Claims. (Cl. 260—249.6)

The present invention relates to monophenylmelamine and more particularly to an improved process for its production.

Monophenylmelamine (2 - anilino - 4,6-diamino-s-triazine) is useful as an aminoplast in the preparation of surface coating resins and as an intermediate in the preparation of various other types of synthetic resins. It is well known that monophenylmelamine can be prepared by the reaction of 2,4-diamino-6-chloro-s-triazine with aniline in aqueous medium followed by neutralization to convert the monophenylmelamine hydrochloride to the free base. This method is generally satisfactory. However, it has been observed that when the monophenylmelamine so produced is resinified by reaction with formaldehyde, for example, the resulting resin is characterized by an undesirable color ranging from pink or lavender to dark brown which makes it unsuitable in many common applications. Frequently, the color may be visually observed in the monophenylmelamine monomer itself, but even when the discoloration is not readily apparent to the naked eye, color bodies are present in the monomer which are so intensified in the resinification process that the resulting resin is unacceptable because of its high color.

We have now discovered that monophenylmelamine suitable for preparing resins of a satisfactory color and for other uses in which color of the final product is important can be prepared and used without additional purification if certain modifications are made in the process as practiced in the prior art. Briefly, this invention involves conducting the reaction in the presence of an antioxidant to prevent the formation of the substance or substances which are responsible for the objectionable color in the substituted melamine.

According to a specific embodiment of the invention, the 2,4-diamino-6-chloro-s-triazine, aniline, and an antioxidant which is stable for at least 15 minutes in hot acid solution are slurried together in water, heated to 95–105° C., i. e., reflux temperature, and maintained under reflux conditions for from 0.5 to 3 hours. The reaction mixture is then filtered while hot, cooled to 25–35° C., and neutralized with a strong base. The precipitated monophenylmelamine is recovered by filtration and thoroughly washed with water. It is then ready for use or may be dried if desired.

The invention is illustrated by the following examples in which all parts given are by weight. However, these are not to be construed as limiting it in any manner except as it is limited in the appended claims.

Example 1

A two-liter, three-necked flask is fitted with a stirrer, a reflux condenser, a thermometer, and a gas inlet tube of sufficient length so as to extend about ½ inch below the surface of the liquid. About 800 parts of water, 100 parts (0.688 mole) of 2,4-diamino-6-chloro-s-triazine and 65.76 parts (0.706 mole) of aniline and 1.8 parts (0.0042 mole) of tris-2-ethylhexyl phosphite are charged to the flask. The mixture is heated until it begins to reflux and is maintained under reflux (95–105° C.) conditions for about 3 hours. The solution is filtered while hot and the filtrate is cooled to 30° C. While the filtrate solution is stirred vigorously, a 5% aqueous solution of sodium hydroxide is slowly added to it until the pH rises to 10.4. This requires about 500–550 ml. of sodium hydroxide. The monophenylmelamine precipitated is filtered off and washed by slurrying it first with 500 ml. of 1% aqueous sodium hydroxide, draining, and reslurrying with 500 ml. of water. The white product is then dried at 100° C. for 18 hours to yield 126 parts (90.7%) of the dry material.

This monophenylmelamine is used in formulating a surface coating resin as follows:

Approximately 50 parts of the monophenylmelamine (0.25 mole), 101 parts of a 37% aqueous formaldehyde solution (1.25 moles of formaldehyde), 100 parts of n-butanol (1.33 moles), and 50 parts of water (2.8 moles) are charged to a 500-ml. 3-necked, Pyrex flask equipped with a stirrer, a thermometer, and a reflux condenser. Enough of a 5% aqueous solution of sodium hydroxide is added to produce a pH of 8.5–9.0 and the mixture is heated while it is continuously stirred until it begins refluxing. The mixture is maintained under reflux conditions for about 30 minutes after which the pH is adjusted to about 5.5 by the addition of 10% aqueous oxalic acid. Water is then removed from the mixture by azeotropic distillation for a period of from 2–3 hours. The remaining mixture is distilled at atmospheric pressure to an end-point temperature of 105° C. Thereafter, butanol is removed by vacuum distillation at 100 mm. pressure to yield a resin having from 65–70% total solids. The resin is diluted with xylol to a solids content of about 60% and filtered using a filter aid. The resin thus obtained does not have any pink or lavender coloration.

Example 2

The entire procedure of Example 1 is repeated except that no antioxidant is added. The resin produced from the monophenylmelamine made under these conditions has a definite pink cast.

It is to be understood that this invention is not limited to the particular conditions given in the examples. Instead of tris-2-ethylhexylphosphite, for example, any of the group of tri-alkyl or tri-aryl phosphite esters may be used, such as trimethyl phosphite, triethyl phosphite, triisopropyl phosphite, triisobutyl phosphite, triphenyl phosphite, tris-2-methylphenyl phosphite, tris-3-methylphenyl phosphite, tris-4-methylphenyl phosphite, tris-o-xylyl phosphite, and the like. The amount of the antioxidant to be added may vary with amounts in the range from 0.1% to 5.0% by weight of the 2,4-diamino-6 - chloro - s-triazine being suitable. Preferably, the amount of phosphite added is kept within the range from 0.5% to 2.0% by weight of the 2,4-diamino-6-chloro-s-triazine.

The use of equimolar proportions of aniline and the chlorotriazine is preferred. An excess of one or the other of the reactants can be employed but appears to offer no particular advantage. An amount of water sufficient to maintain the monophenylmelamine formed in solution or to keep the reaction slurry in a sufficiently fluid state to permit easy filtering should be employed for optimum efficiency in operation. About 88 moles of water per mole of aniline or chlorotriazine is the maximum amount required and amounts from the minimum up to 175 moles per mole of either reactant are usually preferred. Larger quantities can be used but tend to be undesirable from a practical standpoint since the water must subsequently be removed and this lengthens process time needlessly.

Formation of the aryl-substituted melamine occurs readily at temperatures from 50° C. upwards. Preferred temperatures are those in the range from 95 to 105° C., although higher temperatures requiring the use of pressure may be employed if desired. A minimum reaction period of 2–3 hours is required to effect complete reaction and secure maximum yields.

Neutralization and precipitation of the monophenylmelamine hydrochloride from solution can be accomplished by using any of the alkali-metal hydroxides although sodium hydroxide is the preferred base. The temperature at which this reaction is carried out may be varied but best results are obtained at a temperature below 35° C. since at higher temperatures the monophenylmelamine has a tendency to "oil out." Enough of the hydroxide is added to bring the pH of the reaction mixture in the range between 9.5 and 11 and preferably to maintain it at about 10.5.

The precipitated monophenylmelamine can be recovered by any convenient method. Preferably, it is recovered by filtration or centrifugation and then washed and dried.

What is claimed is:

1. In the process for the production of monophenylmelamine wherein 2,4 - diamino - 6-chloro-s-triazine and aniline are reacted in aqueous medium and the monophenylmelamine hydrochloride formed is subsequently neutralized with an alkali metal hydroxide to obtain the monophenylmelamine, the improvement which comprises conducting the reaction of 2,4-diamino-6-chloro-s-triazine and aniline in the presence of an antioxidant which is stable for at least 15 minutes in a hot acid solution.

2. In the process for the production of monophenylmelamine wherein 2,4 - diamino - 6-chloro-s-triazine and aniline are reacted in aqueous medium and the monophenylmelamine hydrochloride formed is subsequently neutralized with an alkali metal hydroxide to obtain the monophenylmelamine, the improvement which comprises conducting the reaction of 2,4 - diamino - 6-chloro-s-triazine and aniline in the presence of an antioxidant chosen from the group consisting of the tri-alkyl and tri-aryl phosphite esters.

3. In the process for the production of monophenylmelamine wherein 2,4 - diamino - 6-chloro-s-triazine and aniline are reacted in aqueous medium and the monophenylmelamine hydrochloride is formed is subsequently neutralized with an alkali metal hydroxide to obtain the monophenylmelamine, the improvement which comprises conducting the reaction of 2,4-diamino-6-chloro-s-triazine and aniline in the presence of an antioxidant chosen from the group consisting of the tri-alkyl and tri-aryl phosphite esters, said antioxidant being present in an amount in the range from about 0.1% to about 5.0% by weight of the 2,4-diamino-6-chloro-s-triazine.

4. In the process for the production of monophenylmelamine wherein 2,4 - diamino - 6-chloro-s-triazine and aniline are reacted in aqueous medium and the monophenylmelamine hydrochloride formed is subsequently neutralized with an alkali metal hydroxide to obtain the monophenylmelamine, the improvement which comprises conducting the reaction of 2,4-diamino-6-chloro-s-triazine and aniline in the presence of a tri-alkyl phosphite ester.

5. In the process for the production of monophenylmelamine wherein 2,4 - diamino - 6-chloro-s-triazine and aniline are reacted in aqueous medium and the monophenylmelamine hydrochloride formed is subsequently neutralized with an alkali metal hydroxide to obtain the monophenylmelamine, the improvement which comprises conducting the reaction of 2,4-diamino-6-chloro-s-triazine and aniline in the presence of a tri-alkyl phosphite ester in an amount in the range from about 0.1% to about 5.0% by weight of the 2,4-diamino-6-chloro-s-triazine.

6. In the process for the production of monophenylmelamine wherein 2,4 - diamino - 6-chloro-s-triazine and aniline are reacted in aqueous medium and the monophenylmelamine hydrochloride formed is subsequently neutralized with an alkali metal hydroxide to obtain the monophenylmelamine, the improvement which comprises conducting the reaction of 2,4-diamino-6-chloro-s-triazine and aniline in the presence of a tri-aryl phosphite ester.

7. In the process for the production of monophenylmelamine wherein 2,4 - diamino - 6-chloro-s-triazine and aniline are reacted in aqueous medium and the monophenylmelamine hydrochloride formed is subsequently neutralized with an alkali metal hydroxide to obtain the monophenylmelamine, the improvement which comprises conducting the reaction of 2,4-diamino-6-chloro-s-triazine and aniline in the presence of a tri-aryl phosphite ester in an amount in the range from 0.1% to about 5.0% by weight of the 2,4-diamino-6-chloro-s-triazine.

8. In the process for the production of monophenylmelamine wherein 2,4 - diamino - 6-chloro-s-triazine and aniline are reacted in aqueous medium and the monophenylmelamine hydrochloride formed is subsequently neutralized with an alkali metal hydroxide to obtain the monophenylmelamine, the improvement which comprises conducting the reaction of 2,4 - diamino - 6-chloro-s-triazine and aniline in the presence of tris 2 - ethylhexyl phosphite.

9. In the process for the production of monophenylmelamine wherein 2,4 - diamino - 6-chloro-s-triazine and aniline are reacted in aqueous medium and the monophenylmelamine hydrochloride formed is subsequently neutralized with an alkali metal hydroxide to obtain the monophenylmelamine, the improvement which comprises conducting the reaction of 2,4 - diamino - 6-chloro-s-triazine and aniline in the presence of tris 2 - ethylhexyl phosphite in an amount in the range from about 0.1% to about 5.0% by weight of the 2,4-diamino-6-chloro-s-triazine.

References Cited in the file of this patent

UNITED STATES PATENTS 2,448,338    Widmer _____ Aug. 31, 1948

OTHER REFERENCES

Walker et al.: J. Am. Pharm. Assoc., vol. 39, pages 393–396 (1950).

Banks: J. Am. Chem. Soc., vol. 66, pages 1127–1130 (1944).

Banks et al.: J. Am. Chem. Soc., vol. 66, pages 1771–1775 (1944).

UNITED STATES PATENT OFFICE

CERTIFICATE OF CORRECTION

Patent No. 2,861,071                                  November 18, 1958

Oscar P. Cohen et al.

It is hereby certified that error appears in the printed specification of the above numbered patent requiring correction and that the said Letters Patent should read as corrected below.

Column 2, line 69, for "maximum" read -- minimum --.

Signed and sealed this 16th day of June 1959.

(SEAL)
Attest:

KARL H. AXLINE
Attesting Officer

ROBERT C. WATSON
Commissioner of Patents